INVENTOR
SIDNEY BRIGGS III

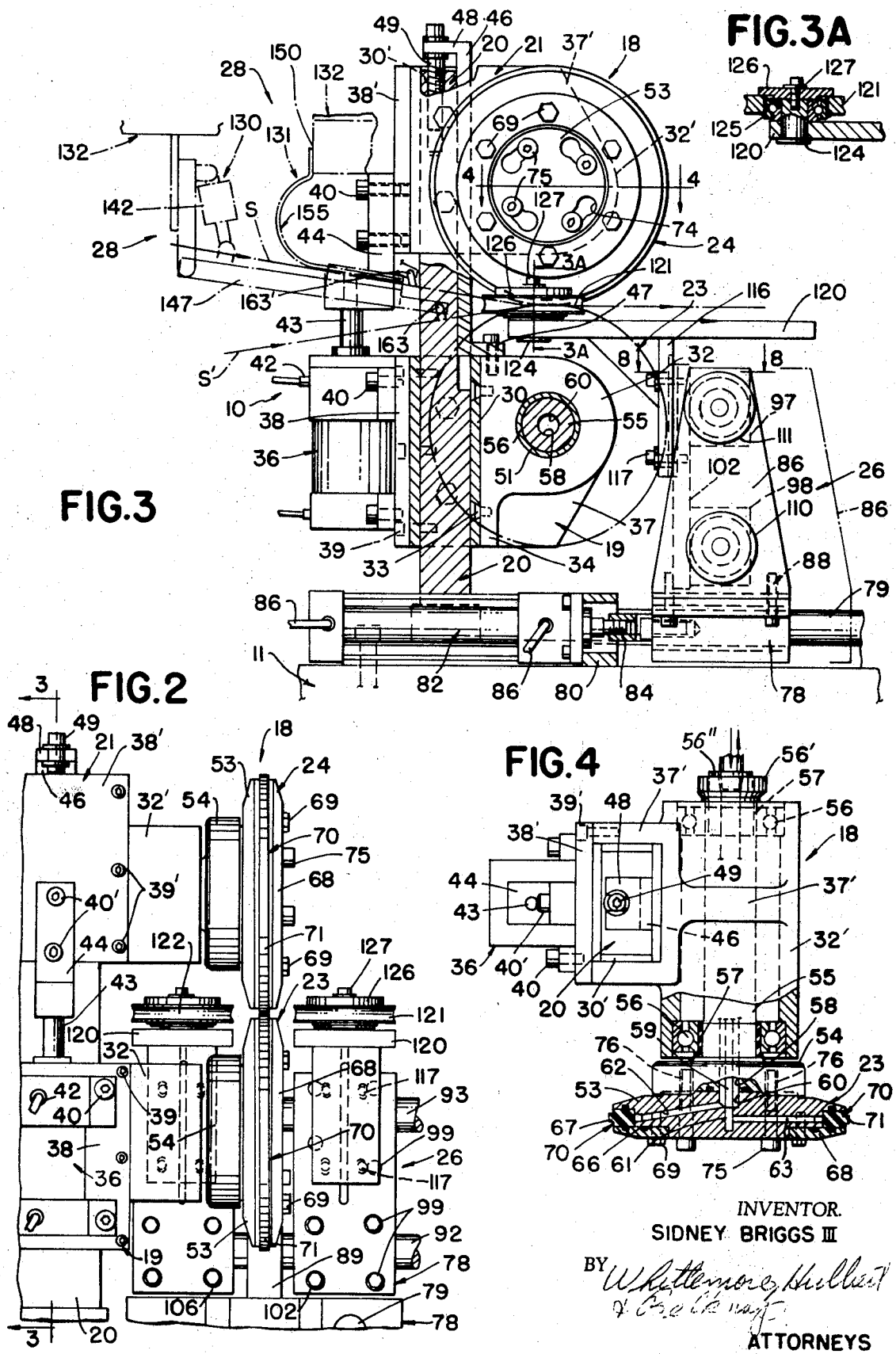

June 23, 1970  S. BRIGGS III  3,517,158
STRIP EDGE BUTT WELDING MACHINE
Filed May 1, 1967  4 Sheets-Sheet 3

INVENTOR.
SIDNEY BRIGGS III
BY
*Whittemore, Hulbert*
*& Belknap*
ATTORNEYS

INVENTOR.
SIDNEY BRIGGS III

BY
ATTORNEYS

United States Patent Office 3,517,158
Patented June 23, 1970

3,517,158
STRIP EDGE BUTT WELDING MACHINE
Sidney Briggs III, Bay City, Mich., assignor to The Thomson Corporation, Bay City, Mich., a corporation of Delaware
Filed May 1, 1967, Ser. No. 634,924
Int. Cl. B23k 9/02, 11/02
U.S. Cl. 219—102                                      16 Claims

ABSTRACT OF THE DISCLOSURE

There is herein disclosed a machine which is similar in function to, and incorporates a series of components basically the same as, the machine illustrated and described in my Letters Patent No. 3,325,623, dated June 13, 1967. Both machines in general comprise provisions for guiding a pair of flat metallic strips in convergent horizontal paths into and through a welding zone, in which the strips are locally heated at adjacent edges to a welding temperature, as by resistance-type electrodes or other means. However, in some installations it may be desirable to employ another type of heating means such as an inductive unit or an electron beam unit. The weld is completed, as the edges are as thus heated and then vertically wiped past one another, i.e., not significantly lapped one upon another, in producing a truly butt type seam weld. The union is assisted by the rolling action of a pair of parallel shaft wheels of a rolling wheel unit.

---

Upon this basic, common and general disclosure of my own, the present invention improves on the latter's combination of components in the following number of respects, not necessarily in the order of importance thereof:

(A) A wheel head structure mounts seam rolling wheels of large diameter, with means for circulating cooling water in an improved way within the interior thereof and directly against the annular internal zone of an improved type of narrow rolling rim or tire applied to each wheel. Moreover, improved provisions are made whereby the wheels in question may be quickly and easily removed from a flange of rotatable shafts on which each is carried, to be just as quickly and easily replaced by an identical spare wheel while the replaced wheel is being redressed.

Force urging and maintaining the large diameter seam rolling wheels toward one another and against the fused seam is exerted through the agency of improved pneumatic means.

(B) An improved side guide and restraint unit is provided by which the strips, in being welded and coming under the action of the seam rolling wheels, are laterally or horizontally guided and confined against separation by improved roll means, as their edges are wiped vertically past one another and united. No appreciable positively applied side pressure is exerted on the strips tending to force them in an overlapping direction, although the side restraint is rigid. The restraint unit has means to adjust it longitudinally, for easy access to the rolling wheel unit from the front of the machine. The side guide and restraint unit also has improved means for adjusting its side guide rolls from the front of the machine.

(C) The machine has an improved type of welding head and electrode unit or sub-assembly, featuring means to insure that a constant and uniform contact pressure is maintained on each strip component by one of two electrode tips as the latter wear away. Specifically, such pressure is exerted by improved pneumatic cylinder means; and electrical current is supplied to the electrode through a resilient lamination of thin conductive strips which also support the electrode from a basic head, thus affording sufficient flexibility at this connection to permit the required electrode motion.

Furthermore, the electrodes are cooled by improved internal water circulating provisions. As in the case of the seam rolling wheels, the electrodes engage the strip components under the influence of improved pneumatic force applying means.

Improved means insulate the electrode structure at all points from the remainder of the machine, including large fixture portions, thus reducing the mass which will be electrically charged, and resulting in a decreased electric loss heat build-up, and the like.

CROSS REFERENCE TO RELATED APPLICATION

The improvements mentioned above are improvements on features of a basically similar machine structure illustrated and described in my patent identified above.

BACKGROUND OF THE INVENTION

Field of the invention

The field of the invention is the same as that of my patent, namely, in the edge-wise butt welding of two flat strips of similar or dissimilar metal after the heating of these strips adjacent the edges thereof, in one way or another, to fusion temperature. Typical uses of the improved equipment are in connection with the production of automotive body components such as trim pad retainers, roof rails, weather strip assemblies, seat panel moldings, and the like. However, the machinery also has obvious application in any field in which the production of an edge-welded union of like or unlike weldable or fusible metal is desired.

Description of the prior art

I am unaware of any prior art disclosures dealing with the edge butt welding of strips under an action of drawing the strips in convergent paths toward one another, heating the same adjacent the edges thereof to welding temperature, and then causing the edges to be wiped vertically past one another, with an insignificant lateral overlap, in producing the fused union thereof in a common plane, accompanied by rolling to finish the seam or joint.

Of the patents known to me, the most pertinent is probably that of Wogerbauer, No. 2,647,981 of Aug. 4, 1953. However, this disclosure deals with the application of substantial side pressure along the plane of edges to be joined, whether in the production of a tubular product, or in the seaming of strips to one another. The effect does not involve an edge wiping action, as mentioned above.

SUMMARY OF THE INVENTION

As also indicated, the invention essentially resides in, and in summary relates to, a number of novel and unobvious improvements on structural components of an edge butt welding machine as disclosed in my co-pending application. The nature of these improvements has heretofore been sketched.

BRIEF DESCRIPTION OF THE DRAWINGS

FIG. 2 is a fragmentary view in end elevation, as from the left of FIG. 1, of the combination of improved wheel and guide provisions referred to;

FIG. 3 is a fragmentary view in front side elevation, partially broken away and a vertical longitudinal section on line 3—3 of FIG. 2, showing the mounting of the seam rolling wheels in relation to the strip side guide provisions, the position of the improved resistance contact welding head and electrode means in relation to the wheel structure being indicated in dot-dash line;

FIG. 4 is a top plan view of the mount for the upper seam rolling wheel, being partially broken away and in horizontal section on line 4—4 of FIG. 3 to show improved means for circulating coolant water within the wheel and against the rolling tire of the latter.

DESCRIPTION OF A PREFERRED EMBODIMENT

Figure 1:
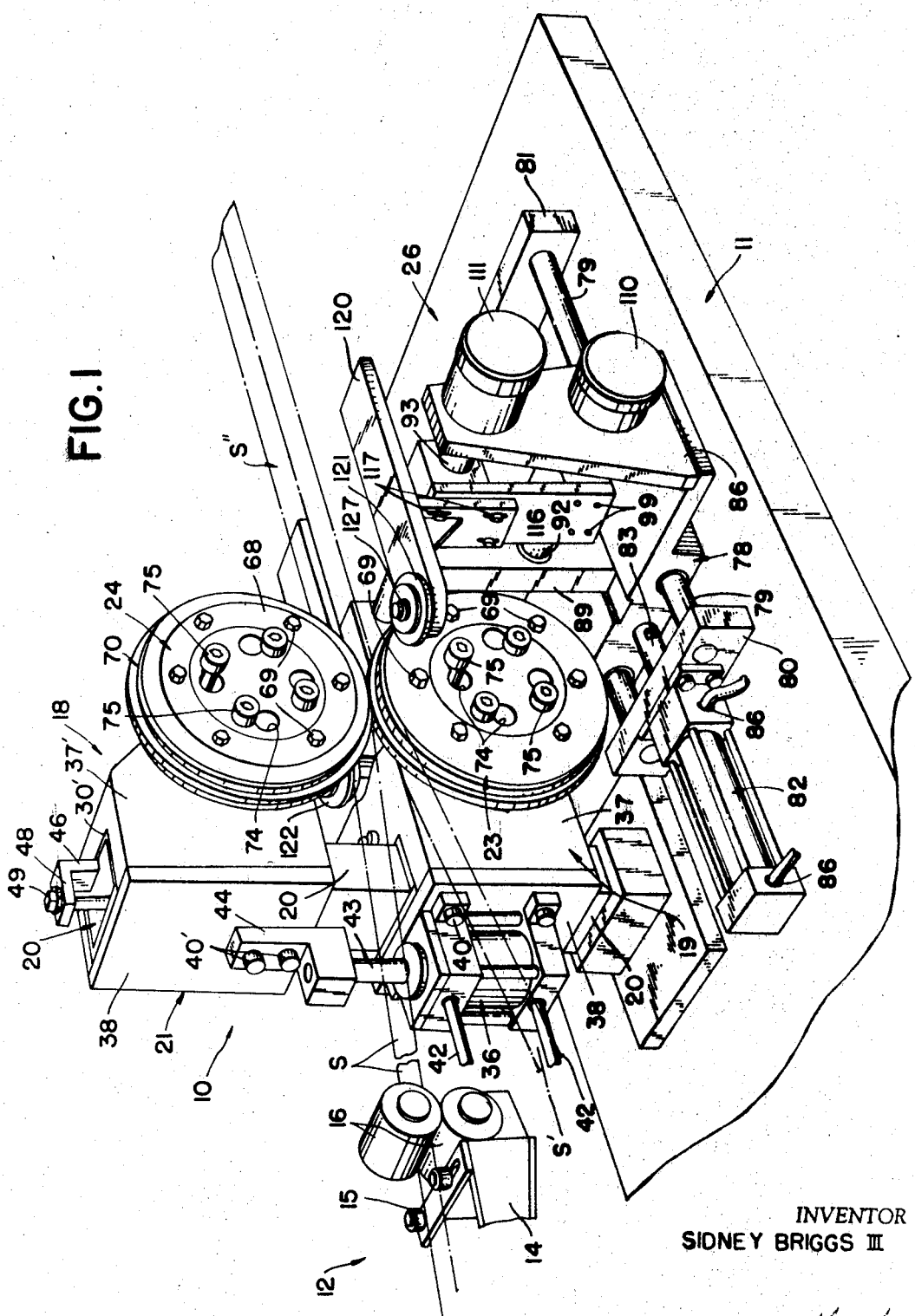
FIG. 1 is a perspective and partially broken away view of a portion of the improved apparatus, with its welding head and electrode fixture omitted, however, for the sake of clarity; the view somewhat schematically shows an arrangement and relationship of certain water cooled seam rolling wheel means, provisions for the pneumatic application of rolling pressure between the rolling wheels, and provisions for guiding and restraining the side edges of the strip components and welded composite strip, all rolled by the wheels; and showing how these provisions are conveniently accessible from the front side of the equipment, as viewed.

As illustrated in FIG. 1, the preferred embodiment 10 of the welding machine is fixedly mounted upon a massive horizontal base 11, past which a pair of thin flexible strips S, S' of similar or dissimilar metal to be edge butt-welded together are fed in vertically convergent relation to one another, each under the control of an in-feed guide and restraining unit 12. This unit is fixedly mounted by appropriate means in longitudinally spaced, forward relation to welder 10; and it is similar in character to the advance guide unit illustrated and described in my patent mentioned above. Accordingly, the composition of guide unit 12 needs but brief description, on the understanding that it is a different one from the improved side guide and restraining unit later described.

Only one of two identical units 12 is illustrated in FIG. 1. It comprises a suitably supported fixed mounting fixture 14 having at least one pair of small diameter side guide rollers 15 journaled thereon on up-right parallel axes, with appropriate provisions for adjusting the lateral spacing of the rollers 15 from one another to engage and restrain a strip S or S'. Fixtures 14 also have means to journal on parallel horizontal and transverse axes a pair of strip tensioning or drag rolls 16, which tend to resist advance of the strips S, S' under pulling force exerted thereon by suitable strip advancing means (not shown) on the side of the welder 10 remote from guide units 12. Such advancing means frictionally engage the welded composite strip, designated in the drawings by the reference character S''.

Figure 6:
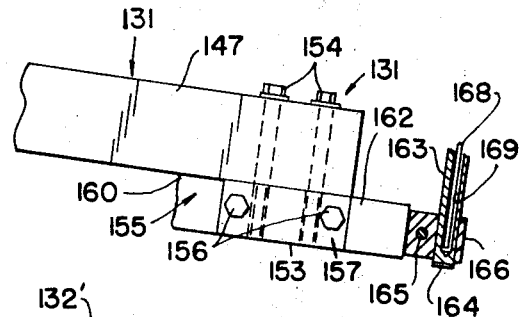
FIG. 6 is a fragmentary top plan view, partially in section on line 6—6 of FIG. 5.
Figure 5:
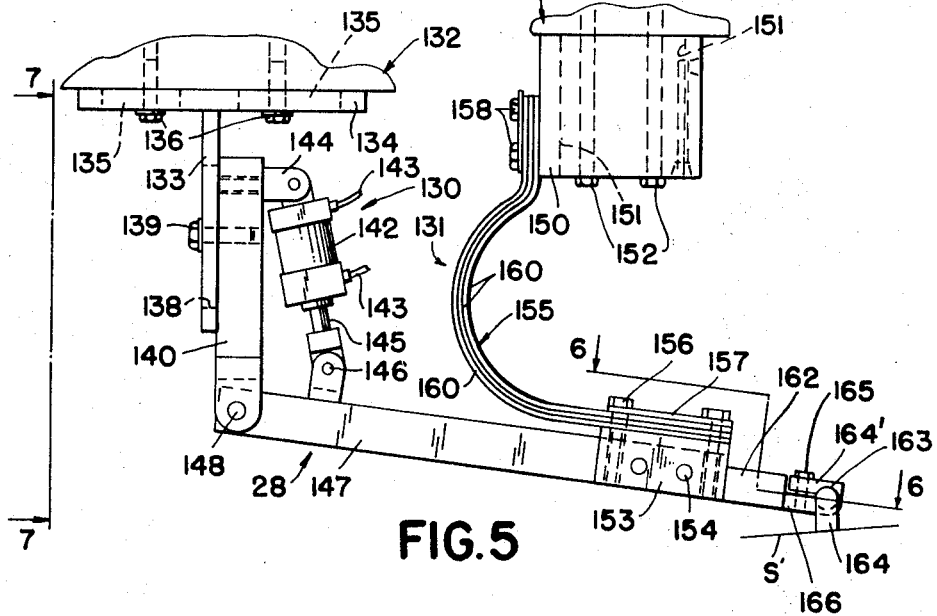
FIG. 5 is a fragmentary view in side elevation of the improved welding heat unit and electrode structure of the invention, including its pneumatic means for applying uniform biasing pressure on the electrode.
Figure 7:
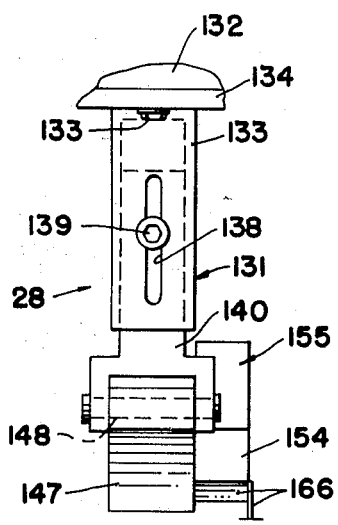
FIG. 7 is a fragmentary view in end elevation from line 7—7 of FIG. 5.

Generally considered, the welding machine 10 comprises an improved rolling wheel head structure 18, which is characterized by a fixed lower head 19 rigidly supported on base 11 through the agency of a massive footed upright column 20 of rectangular cross section, and a movable upper head 21 adjustable guided vertically on column 20, with the heads 19, 21 rotatably supporting narrow lower and upper seam rolling wheels 23, 24, respectively; an improved second side guide and restraining unit, generally designated 26, which laterally controls the strips S, S' as they pass into and through the rolling zone of the wheels 23, 24; and an improved resistance welding head and electrode unit 28, one for each strip S, S', which has been omitted from FIG. 1 for the sake of clarity, is for the same reason shown in dot-dash line in FIG. 3, and is more completely depicted in FIGS. 5, 6 and 7, in reference to which its structural features will be described. These basic components of machine 10 will now be detailed as to structure in the order in which they are referred to above.

ROLLING WHEEL HEAD STRUCTURE

Referring to FIGS. 2, 3 and 4 in conjunction with FIG. 1, the lower and fixed head 19 of structure 18 is mounted to column 20 by means of an up-right sleeve 30 of brass or like bearing material having an internal cross sectional area mating with that of the column, sleeve 30 being fixedly but adjustably secured in relation to column 20, in a way to be described. An internally cylindrical wheel-journalling sleeve 32 is secured by bolts or screws 33 to one side of the plate component mounting sleeve 30, as at a boss or flange 34 of the journalling sleeve 32. Actually, the mounting flange 34 of the wheel-journalling sleeve 32 is part of a rectangular housing portion 37 (schematically shown in FIG. 1) surrounding three sides of sleeve 30, with an end plate 38 completing the housing structure, which externally protects the column 20, mounting sleeve 30 and wheel journalling sleeve 32. A pneumatic cylinder 36 is bolt-secured to the exterior of plate 38, as by means of bolts 40; and plate 38 is secured by bolts 39 to housing 37. Parts of upper wheel rolling head 21 which correspond to those of lower head 19, as just described, are designated by corresponding reference numerals, primed and further description thereof is dispensed with.

The opposite ends of pneumatic cylinder 36 have the usual air hose connections 42 through which the cylinder may be reversely pressurized, under the control of appropriate valving (not shown), to raise and lower the plunger 43 of the cylinder. This plunger is fixedly attached at its upper end to an L-shaped bracket 44 bolted, as at 40', to the upper rolling wheel head 21. The upper wheel head 21 is slidably adjustable on column 20, having bearing engagement with the latter at upper mounting sleeve 30', for up and down sliding action in bringing its wheel 24 into and out of rolling engagement with the strips.

A vertically elongated, plate-like bracket 46 is bolted at a flange 47 thereof (FIG. 3) to the top of the lower wheel journalling housing 37 and an upper, oppositely off-set flange 48 of this bracket rotatively receives an adjusting screw 49. This screw is threadedly engaged in the top of fixed column 20, and serves as a means to initially set the position of lower rolling head 19 in relation to the strips S, S', and to the side guide unit 26.

By reason of the improved pneumatically operated provisions described above for the vertical shifting of and application of force to the rolling wheel head 21, the need to rely upon spring biasing means for that head, and necessary means for the adjustment of such bias, is eliminated. Needed pressure is readily produced, accurately reproduced and controlled at valving (not shown) for pneumatic cylinder 36. By the same token, the pressure is reversed by simply moving a valve control lever, thus spreading the wheels of heads 19 and 21, for the purpose of changing wheels 23, 24 or performing other service or maintainance work on the heads. Further provisions, hereinafter described in connection with the side guide unit or head 26, contribute to quick and easy access to heads 19 and 21 for these or other purposes.

The upper and lower seam rolling wheels are identical and interchangeable, both in respect to improved means for cooling the seam rolling tire part thereof, and for their quick release to shaft means journalling the wheels 23, 24.

Thus, reference being had to FIG. 4, each of the wheels comprises a circular wheel body 53 of substantial but plate-like thickness, which body is releasably secured (by quick change means to be described) to an enlarged flange 54 integral with a transverse wheel shaft 55. This shaft is rotatably journalled in one of the journalling sleeves 32, 32', by means of ball-bearing and bushing units 56, 56' adjacent opposite ends of the shaft 55, with a retainer ring 56" threaded on the shaft externally of unit 56'.

Units 56, 56' each include a bushing or sleeve 57 of electrically insulating material, which is pressed into the inner race of the bearing before installation of the shaft 55. Thus the insulation lies as close as possible to the object to be insulated against, namely, the electrically charged strip S or S'. Accordingly, the machine mass which is electrically charged is reduced as much as possible, there is smaller electric loss, smaller heat build-up, and longer life for the seam rolling tires (to be described) of the wheels 23, 24, which are continually subject to arcing and erosion at the point of contact with the strips.

Wheel shaft 55 and flange 54 have a central bore 58 along the entire length of the axis thereof, and a coolant tube 59 extends centrally through this bore, the shaft 55 being provided, at its end opposite wheel 23, with suitable fitting means for the inflow of water to tube 59 and the outflow thereof from the portion of bore 58 surrounding the tube, as indicated by arrows in FIG. 4. Wheel body 53 has a recess 60 on its axis to communicate with bore 58, and a smaller extension 61 of recess 60, which is in communication with tube 59. Radial passages 62 and 63 in the wheel body 53 communicate, respectively, with recess 60, hence with bore 58, and with the recess extension section 61, hence with the interior of tube 59.

As shown in FIG. 4, the outer axial side of the body 53 of rolling wheel 23 (or 24) is formed with an annular recess 66 of substantial radial depth; and radially inwardly of this recess there is another annular recess 67 of substantially lesser radial depth and somewhat greater axial extent. The radial passages 62 and 63 of wheel body 53 communicate outwardly through the radially inner side of recess 67.

An annular closure disk 68 of the same outer diameter as wheel body 53 is nested in the recess 66, being held to the body by an annular series of bolts 69; and there is thus defined between body 53 and disk 68 an annular groove in which a seam rolling tire 70 is received. This tire may be replaced on the wheel as desired, and has high heat conductivity, being provided with an integral narrow rolling bead 71, which makes direct rolling contact to complete the wiped, edge-butt welded connection of the strips S, S' to one another. Since the main functions of wheels 23 and 24 are for this end, and to maintain the alignment of the inner strip edges, their tires 70 may be axially narrow. Other advantages in the use of a narrow rolling wheel are hereinafter described.

With the flow of cooling water through wheel passages 62, 63 and directly against the inner surface of the wheel tire 70, there is an ideal transfer, absorption and dissipation of heat by the continuous circulation in the interior of the wheel. Cooling is entirely uniform, with no hot spots, whereas in earlier designs these have occasioned some variation in tire dimension. This is apt to leave the tire loose, so that the tire becomes hot, resulting in thermal expansion which in turn further loosens the tire, with an even poorer transfer of heat. In brief, a precision press fit of the tire on the wheel has heretofore been necessary for a reasonably efficient transfer of heat. These disadvantages are avoided in the improved direct cooling action on the wheel tire by the arrangement depicted in FIG. 4.

In another aspect, the invention affords, as indicated above, a quick change mount of the seam rolling wheel on the shaft flange 54. With particular reference being had to FIGS. 1 and 3, each of the wheels 23, 24 is provided with an annular series of circumferentially spaced, bayonet-type slots 74, which extend in the axial direction through the wheel body 53, the slots being shown as four in number in equal spacing from one another. Axially elongated studs 75 in the same manner and equal circumferential spacing are threaded into tapped holes in the wheel mounting flange 54 as at 76 (FIG. 4); and with these studs backed off a trifle, the wheel body 53 is telescoped at its bayonet slots 74 over the respective studs 75. The wheel is then shifted a few degrees to bring the restricted width of the slots about the studs, which are then taken up tightly to complete a driving connection of the wheel 23 or 24 to its shaft 55.

This enables the quick and easy removal of either or both of the wheels, without disassembling any bearing or fixture part. With the bolts or studs 75 loosened, the wheel is turned a few degrees and lifted axially off the shaft flange 54, then replaced with a spare wheel. This is an operation performed in a minute or two, as compared with a much greater time loss in the re-dressing or replacement of previous wheels. Manifestly, the improved machine 10 requires no built-in wheel dressing provision, inasmuch as the quick change, bayonet and bolt feature permits dressing to be done on spare wheels while the welding line is in operation, with resultant considerable saving of time. Bearing in mind that the wheel must be dressed and trued about every eight hours, it is seen that the improvement is an important one.

SIDE GUIDE AND RESTRAINING STRUCTURE

As best illustrated in FIGS. 1 and 3, the unit 26 of this structure is borne by a rather massive cast base 78 mounted by a pair of elongated guide rods or bars 79 to slide longitudinally or parallel to the path of travel of the welded composite strip S", with the bottom of sliding base 78 spaced a trifle above the top of the main machine base 11 (FIG. 3). Opposite ends of guide rods 79 are sustained by transverse end blocks 80, 81; and the former of these has a reversible air cylinder 82 bolted to a forward side thereof. The plunger 83 of the cylinder has an adjustable threaded connection at 84 to the adjacent side of the sliding base 78 of side guide and restraining unit 26.

Thus, when access to the rolling wheels 23, 24 is needed, as for the replacement of the same by spares, air cylinder 82 is pressurized to shift unit 26 bodily to the right along guide rods 79, as from the operative solid line position of FIG. 3 to the dot-dash line position. A reverse pressurization returns unit 26 to its operative position. Suitably valve air pressure lines 86 lead to cylinder 82 for the purpose.

Figure 9:
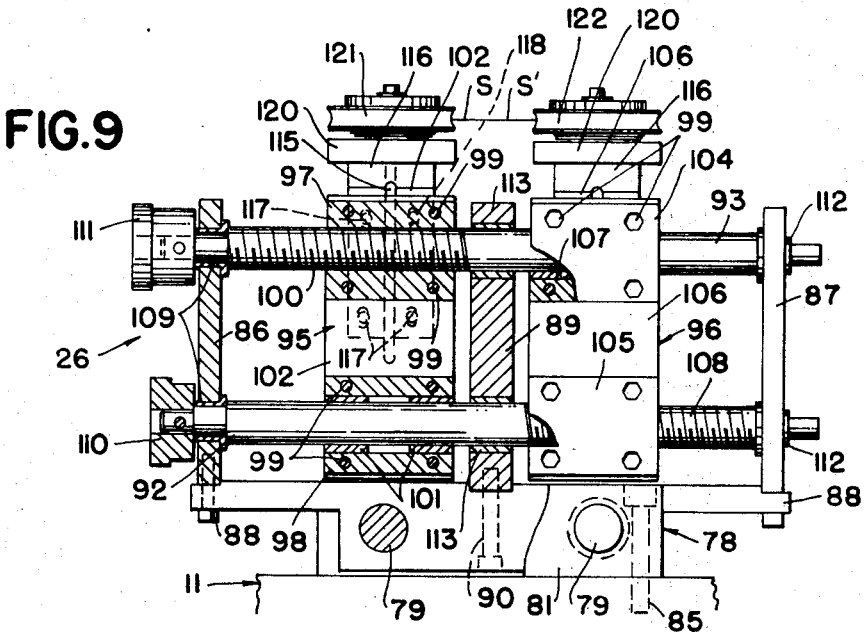
FIG. 9 is a view in transverse section on broken line 9—9 of FIG. 8.

Referring to FIG. 9, the base 78 of the strip side guide and restraining unit 26, as secured to the main machine base 11 by a plurality of bolts or studs 85, has a pair of transversely spaced, upright end plates 86, 87 rigidly held in end rabbets thereof by bolts 88; and intermediate these plates a rugged upright post 89 is rigidly fastened in a recess of base 78 by bolt means 90.

Plates 86, 87 and intermediate post 89 rotatively receive a pair of vertically aligned, parallel and transverse shafts 92, 93 for the transverse sliding guidance of a pair of guide wheel mounting units 95, 96. These respectively engage the rods 92, 93 at positions transversely forwardly and rearwardly on the guide and restraining unit 26, as viewed in FIGS. 1 and 3, and from the right of FIG. 2.

The forward guide unit 95 comprises a pair of upper and lower, vertically aligned, two-part nut and journal blocks 97, 98, respectively, the halves of which have semi-circular recesses and are bolted together by through bolts 99. Block 97 is internally threaded in its cylindrical transverse opening thus provided to matingly engage threads 100 on the upper guide rod 93; while the lower forward guide block 98 is equipped with bushings in which rod 92 is received, thus guiding the forward unit 95 for transverse sliding adjustment upon rotation of rod 93. The upper and lower block components 97, 98 are rigidly coupled together by an upright plate 102, the bolts 99 effecting the connection of this plate to the blocks.

In a generally similar fashion, the rear guide unit 96 comprises upper and lower two-part journal and nut blocks 104, 105, respectively, rigidly coupled together by an upright plate 106 and a set of the bolts 99. Upper block 104 has bushings 107 slidably guiding unit 96 on rod 93; while lower block 105 is internally threaded to mate with threading 108 on lower guide rod 92.

Projecting forwardly through bushings 109 in front plate 86, the guide rods 92, 93 have finger knobs 110, 111 pinned respectively thereto. Rear ends of the rods are journalled by appropriate bushing means 112 in the rear plate 87; and the intermediate post 89 is equipped with bushings 113 (FIG. 9) in which the rods 92, 93 rotate, thus being strongly stabilized in this intermediate zone.

Figure 8:
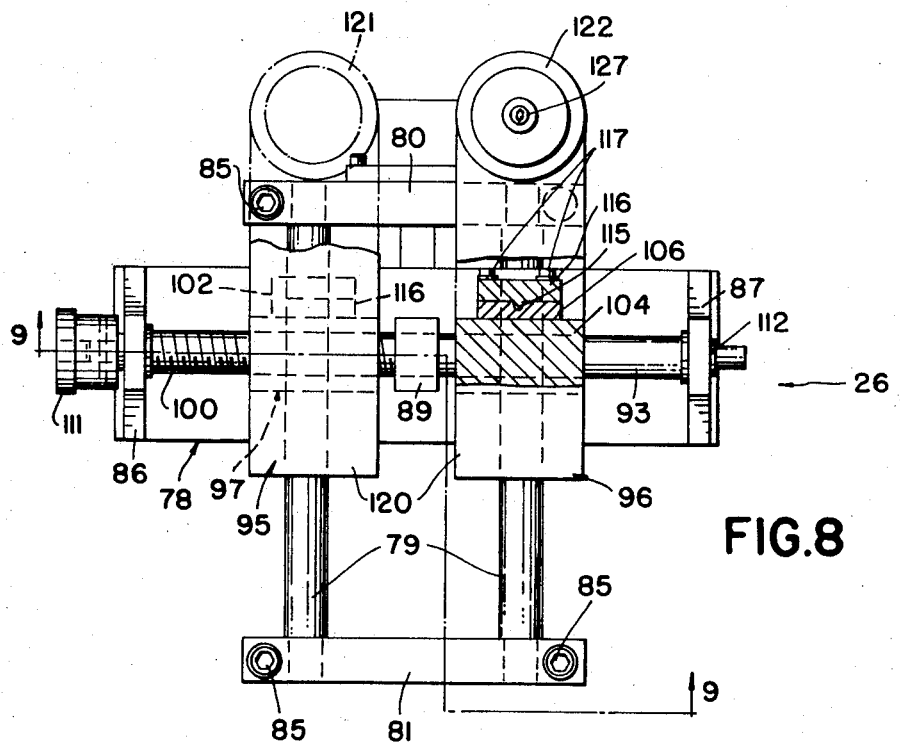
FIG. 8 is a top plan view, partially broken away and in horizontal section on line 8—8 of FIG. 3, further illustrating the improved side guide structure of the apparatus, the rolling wheel provisions being omitted for clarity.

Now referring to FIG. 3 in conjunction with FIGS. 8 and 9, each of the upright plates 102, 106, which unite the respective sets of forward guide blocks 97, 98 and rearward blocks 104, 105, is provided adjacent its top with a vertically extending groove of limited height, which groove receives for vertically sliding adjustment a somewhat more elongated rib 115 (FIG. 8) formed integrally on an upright mounting plate 116; and the plates 116 are adjustably secured to the block-coupling plates 102, 106. The arrangements, which are identical in each case, include screws or bolts 117 extending through vertically elongated openings in the plate 116 and into threaded engagement with tapped openings in plates 102 and 106.

Finally, each of the mounting plates 116 has an elongated bar 120 welded or otherwise rigidly secured to its top, in the manner of the head of a T, and each bar 120 has provision, adjacent the end thereof facing the direction from which the strips S, S' advance, for rotatably journalling one of two front and rear side guide and restraining rolls 121, 122, respectively, on an upright axis. In an operative position of the guide and restraining unit 26, such as is shown in solid line in FIG. 3, the transversely aligned axes of the rolls will be located a trifle in advance of a vertical plane through the axes of seam rolling wheels 23, 24, thus positively side-restraining the strips S, S' (which have been heated to welding temperature by the welding head and electrode provisions to be described) against transverse separating shift, as the wheels 23 and 24 operate to complete the edge-wiped union of the two strips under the principle illustrated and described in my patent identified above.

It is seen that, whether the side guide and restraining unit 26 is positioned, under the control of pneumatic cylinder 82, either for operative rolling action (solid line) or for access to the wheel 23, 24 (dot-dash line), an attendant manipulating the finger knobs 110, 111 may readily, easily, and conveniently position the two guide units 95, 96 and their wheels 121, 122 in the transverse sense relative to one another and/or to the strips S, S'. As in the case of the seam rolling structure 18, parts are fully accessible at the front of machine 10, and the spacing of guide wheels 121, 122 is easily and precisely adjusted so that maximum efficiency in the edge wiping and welding operation is attained.

The mount for the guide rollers 121, 122 is illustrated in FIG. 3a. For this purpose, each of the arms 120 fixedly carries adjacent its end an upright stem or stud 124 surrounded adjacent the top thereof by a ball bearing and insulative bushing unit 125, and a top retainer disc 126 bears downwardly upon stud 124 and the inner race of bearing unit 125, being held in place by a screw 127 threadedly engaged in a tapped opening at the top of the stud. Unit 125 electrically isolates the wheels 121, 122 as close as possible to the charged strip material, just as do the bearing units 56 of rolling wheel 23, 24.

WELDING HEAD AND ELECTRODE STRUCTURE

The structure 28 is schematically indicated in dot-dash line in FIG. 3 in its approximate positional relationship to the strips S, S' as they approach and enter a weld-heating zone directly to the left of the side guide and restraint rolls 121, 122. The head and electrode structure is identical as to each of two units thereof; one, typically illustrated in FIGS. 5, 6 and 7, is the unit which heats the strip S'. It may be considered to be constituted, in general, by two interconnected sub-assemblies or sub-units, namely, a pressure-applying sub-assembly 130 and a resistance heating electrode sub-assembly 131. A single electrode component only, of the corresponding electrode sub-unit for heating the other strip S, appears in FIG. 3, its reference numeral being primed.

The sub-assembly 130 is supported from above, and in close adjacency to the edge of the strip S' entering the welding zone, by an appropriate fixed support 132 of the machine 10, and has a T-shaped mounting bracket 133 adjustably suspended from the support 132 in a manner to permit a longitudinal adjustment of that sub-assembly in the direction of travel of the strips. To this end, the top flange 134 of bracket 133 is provided with a pair of elongated slots, through which clamp screws 136 extend into threaded engagement with tapped openings in the overhead support 132.

The depending member of bracket 133 is provided with a vertically elongated slot 138, through which a clamping bolt 139 extends into threaded engagement in a tapped hole in an upright anchor bar 140 of the sub-assembly 130; and a small air cylinder 142, equipped with the usual pressure connections 143, is pivotally connected at one end to a side lug 144 located on anchor member 140 adjacent the top thereof. The plunger 145 of cylinder 142 is pivotally joined at a clevis connection 146 to the top of an elongated electrode pressure arm 147 of non-conductive material, which arm is itself pivotally connected at 148 adjacent an end thereof, to the lower end of anchor bar or member 140.

The electrode sub-assembly 131 of unit 28 is also suspended from an overhead support, which in this instance is an electrically conductive and charged one, designated 132', through the agency of a relatively massive, electrically conductive block 150, which has an elongated slot 151 opening vertically through it. Elongated studs 152 extend through this slot into threaded engagement with the fixed support 132', thus enabling a desired adjustment, lengthwise of the strip, of sub-assembly 131, just as the pressure-applying sub-assembly 130 is adjustable in the same direction.

An electrically conductive terminal block 153 is mounted by bolts 154 to a side of the pivoted pressure arm 147, inwardly of the free end of that arm, and an improved resilient conductor unit generally designated 155, is secured by a pair of bolts 156 to the top of block 153, with a pressure pad 157 interposed, adjacent the lower end of conductor unit 155. The opposite end of the conductor unit is similarly secured by bolts 158 and a pressure pad to a side of the conductive mounting block 150.

Conductor unit 155 is in the form of a laminated bundle of individually flexible copper strips 160 (shown as three in number, although this may vary). They are disposed in a bowed outline, affording an effective spring action downwardly on pressure arm 147; and are, needless to say, in intimate electrically conducting contact with one another.

Finally, a reduced section extension 162 of the terminal block 153 has a removable and replaceable welding electrode 163 mounted thereon adjacent its free extremity, the electrode presenting a downwardly directed welding tip 164 to engage the strip S' adjacent its edge to be welded. The releasable connection is made through the agency of a small clamping clip 164' which engages the body of electrode 163 from above, and is releasably secured by a screw 165 to a reduced extremity 166 of extension 162. With bolt 165 tightly taken up, electrode 163 is firmly held in a seat on the extremity portion 166, but is quickly removed and replaced.

As shown in FIG. 6, the electrode 163 is cooled by internal circulatory tube and bore means 168, 169, respectively, much in the manner that the seam rolling wheels 23 and 24 are cooled through a shaft bore and tube. Water cooling of the electrode 163 is necessary when using the longer wearing alloys as a material for tip 164, since, due to their low electrical conductivity, these alloys give rise to considerable heat.

An important advantage of the improved welding head and electrode structure 28 resides in the fact that the resilient, electrically conductive bundle 155 of copper strips eliminates the need for reliance upon a pivoting joint in applying pressure to the electrode, which joint must also conduct electrically. Such means, coupled with springs as heretofore, does not always give peak electrical efficiency, and is apt to result in heating problems.

Furthermore, in any electrode mount urged by coil spring bias or the like, contact pressure diminishes with downward motion as the electrode tip wears away. However, by applying basic pressure through the agency of the air-cylinder 142, with contact uniformly established through the flexible conducting bundle unit 155, a predetermined and desired pressure on the strip is possible regardless of electrode tip position or wear. Still further, the non-conductive nature of the pivoting arm 147 insulates the pressure-applying provisions of sub-assembly 130 from the power applied through resilient conductor unit 155.

SUMMARY

The improved machine represents an advance over prior art seam welders, lap or butt type, whether or not of the sort shown and described in my patent in the following respects:

(A) In a general way, the fixture parts have a longer life and may more readily be removed for servicing and replaced, with less retirement of machine 10 from operation;

(B) Rolling wheels 23, 24 replace rolling members of much greater axial width, up to the full axial width of the composite strip S″, all having the following disadvantages:

(1) In the case of stainless steel strips, the marking of the latter by physical contact, electrical arcing, and/or dirt embedded in the wheel surface;

(2) The wheel portion contacting a galvanized strip, for example, picking up zinc, its oxides, welding slag, etc.;

(3) Erosion rapidly of the portion of the wheel directly over the weld by thermal, mechanical and electrical abuse, requiring frequent regrinding or replacement.

Thus, inasmuch as the wheels 23 and 24 are only employed primarily to position the edges of strips S, S′ relative to one another, a narrow width of the wheel tires 70 and their rim 71 is advantageous. Water cooling of the rims is a solution of the erosion factor of (3) above. To the same effect is the quick wheel change feature.

(C) The large diameter of wheels 23, 24 makes for an increased life of their tires 71. It also results in a longitudinal spreading out of the several welding head, rolling and side guide fixture components, making them more readily accessible to service. The pressure of wheels 23, 24 against the work is a constant, pneumatically controlled one.

(D) A pneumatically assisted adjustment of the side guide structure 26 contributes materially to this accessibility. The side guidance of the strips S, S′ is a rigid but accurately controlled one.

(E) The concept of the two longitudinally adjustable sub-assemblies 130, 131 of the two welding head and electrode units 28, meets a problem in that when welding dissimilar metals by high frequency process, each metal has a different electrical conductivity, heat conductivity and melting or welding temperature. To attain a successful weld, both strips must reach their respective melting or welding temperature at the same time or point, which would be the apex of the converging strips. Since both strips are heated by the same amount of current in a single electrical circuit, it becomes necessary to compensate for the differences in electrical conductivity and heating rates by placing the electrodes 163, 163′ nearer to or farther from the apex.

(F) The direct water cooling of rolling tires, electrodes, etc., and their direct electrical insulation from massive parts of machine 10, represent a significant improvement in the efficiency of the machine as a whole.

(G) Quick replaceability of wheels 23, 24, results in a fractionalized "down" time of the equipment.

What is claimed is:

1. An improvement in an apparatus for welding individual elongated strip components to one another along a longitudinal seam zone, which apparatus comprises means for guiding said components convergently to and through said zone, means to heat said components to a temperature for thermal fusion at said seam zone, and means for rolling said components to complete a welded, substantially coplanar union of the thus heated components to one another along said seam zone; said improvement comprising a pair of rolling wheels of distinctly limited axial dimension and relatively large diameter each having a connection to means rotatively journalling the same on parallel axes on opposite sides of said zone for rolling engagement with the strip components at said zone, at least one of said wheels having a peripheral annular rolling member of a narrow axial dimension approximating that of the seam zone, said wheel having coolant flow means externally communicating through the axis thereof with the internal periphery of the wheel, and directly against said rolling member, said heating means comprising a pair of heating members having means to adjust the position of said members relative to one another to regulate the relative heating of the components.

2. The improvement of claim 1, in which said connection comprises a rotatably releasable bayonet and slot union of the wheel to the journalling means.

3. The improvement of claim 1, and further comprising a side guide unit having rollers laterally engaging and restraining opposite sides of the strip components in an unyielding manner.

4. The improvement of claim 3, and further comprising means to adjust the position of said side guide unit longitudinally of the direction of advance of the strip components.

5. The improvement of claim 3, and further comprising means to adjust the position of said side guide unit longitudinally of the direction of advance of the strip components, said adjusting means comprising a fluid pressure cylinder unit operatively connected to said side guide unit.

6. The improvement of claim 1, and further comprising fluid pressure-operating means for resiliently urging at least one of said rolling wheels against the strip components at said zone for rolling engagement.

7. The improvement of claim 2, and further comprising fluid pressure-operating means for resiliently urging at least one of said rolling wheels against the strip components at said zone for rolling engagement, and for separating said wheels relative to one another.

8. The improvement of claim 1, in which said heating means comprises a pair of heating members having means to adjust the position of said members relative to one another to regulate the relative heating of the components.

9. The improvement of claim 1, in which said heating means comprises a pair of heating members each slidably contacting a strip component adjacent an edge thereof and having means to adjust the position of said members relative to one another in the direction of strip travel to regulate the relative heating of the edges of the components.

10. The improvement of claim 2, in which said heating means comprises a pair of heating members each slidably contacting a strip component adjacent an edge thereof and having means to adjust the position of said members relative to one another to regulate the relative heating of the edges of the components.

11. Apparatus for welding elongated traveling components to one another along a longitudinal zone of a seam, comprising means for guiding said components convergently to and in said zone, heating members adjacent said zone to electrically heat said respective components to a temperature for thermal fusion at said zone, means to adjust the position of at least one of said members relative to the other to regulate the relative heating of the components, and means for rolling said components at the seam to complete a welded union thereof, comprising a pair of rolling wheels of distinctly limited axial dimension and relatively large diameter having means rotatively journalling the same on parallel transverse axes on opposite sides of said zone for rolling engagement with the components at said zone.

12. Apparatus for welding elongated traveling components to one another along a longitudinal zone of a seam, comprising means for guiding said components convergently to and in said zone, heating members adjacent said zone to electrically heat said respective components to a temperature for thermal fusion at said zone, means to adjust the position of at least one of said members relative to the other to regulate the relative heating of the components, and means for rolling said components at the seam to complete a welded union thereof, comprising a pair of rolling wheels of distinctly limited axial dimension and relatively large diameter having means rotatively journalling the same on parallel transverse axes on opposite sides of said zone, at least one of said wheels having internal means to circulate a coolant radially outward toward the periphery thereof.

13. The improvement of claim 12, in which at least one of said wheels has a peripheral rolling rim or like member of a narrow axial dimension approximating that of the seam zone, said wheel having coolant flow means externally communicating through the axis thereof with the internal periphery of the wheel, and directly within and adjacent said rolling member.

14. The improvement of claim 11, in which at least one of said wheels has means for the quick-release replaceable connection thereof as a unit to said journalling means.

15. The improvement of claim 13, in which at least one of said wheels has means for the quick-release replaceable connection thereof as a unit to said journalling means, said connection comprising a rotatably releasable bayonet and slot union of the wheel to the journalling means.

16. The improvement of claim 11, in which said heating members have slidable, electrically contacting engagement with the said components adjacent the edges thereof at which the seam is formed.

References Cited

UNITED STATES PATENTS

| | | | |
|---|---|---|---|
| 1,931,899 | 10/1933 | McLeod | 151—63 |
| 2,281,805 | 5/1942 | Schenk | 219—106 |
| 2,453,438 | 11/1948 | Horth | 219—81 |
| 2,647,981 | 8/1953 | Wogerbauer | 219—67 |
| 2,846,562 | 8/1958 | Vltavsky | 219—81 |
| 2,922,020 | 1/1960 | Andrew | 219—59 |
| 3,056,883 | 10/1962 | Eisenburger et al. | 219—107 |
| 3,319,040 | 5/1967 | Rudd | 219—104 |

JOSEPH V. TRUHE, Primary Examiner

L. A. SCHUTZMAN, Assistant Examiner

U.S. Cl. X.R.

219—59, 78, 84